(Specimens.)

H. M. HANMORE.
BOILER COVERING.

No. 345,843. Patented July 20, 1886.

Witnesses.

Inventor:
Hiram M. Hanmore

UNITED STATES PATENT OFFICE.

HIRAM M. HANMORE, OF PHILADELPHIA, ASSIGNOR OF ONE-HALF TO HENRY G. KEASBEY, OF AMBLER, AND RICHARD V. MATTISON, OF PHILADELPHIA, PENNSYLVANIA.

BOILER-COVERING.

SPECIFICATION forming part of Letters Patent No. 345,843, dated July 20, 1886.

Application filed January 19, 1886. Serial No. 189,032. (Specimens.)

*To all whom it may concern:*

Be it known that I, HIRAM M. HANMORE, of the city and county of Philadelphia, in the State of Pennsylvania, have invented a new and useful Improvement in Non-Conducting Coverings or Jackets and Compositions, of which the following is a specification.

Steam-pipes, steam-boilers, and other heated vessels or conduits are now commonly covered with some non-conducting material in order to prevent the radiation of heat outward, and to conduce to the economical operation of apparatus comprising such elements. It is found that carbonate of or calcined magnesia is one of the best non-conducting materials which can be made use of for such purposes; and my invention relates to coverings or jackets and compositions which include carbonate of or calcined magnesia as an essential element.

The invention consists in a non-conducting covering or jacket composed of molded tiles or sections of a composition which includes as its non-conducting element a major proportion of carbonate of or calcined magnesia, and which also includes a sufficient quantity of fibrous material—such as asbestus fiber—to bind the magnesia together, the magnesia in any case forming of itself the principal non-conducting element of the composition.

The invention also consists in a non-conducting composition composed of a major proportion of carbonate of or calcined magnesia, which forms of itself the principal non-conducting element of the composition, and a minor proportion of asbestus fiber sufficient to form a binding material for the composition and prevent the same from cracking.

The invention may be embodied in tiles or sections of any shape suited to the exterior of the vessel or pipe which they are to cover. Those tiles for covering boilers or other vessels or objects which have flat surfaces or surfaces of large curvature may be made flat or slightly curved, while tiles or sections for covering pipe may be made in semicircular or other segmental sections of a curvature to fit the pipe.

Figure 1:
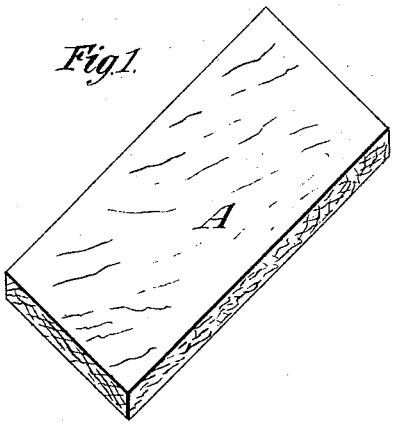
Figure 2:
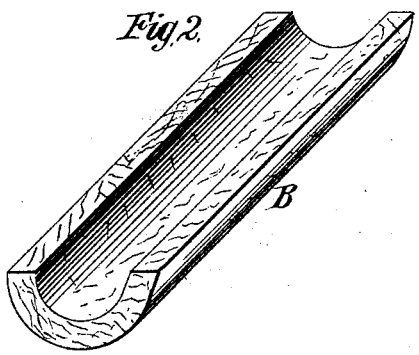
Figure 3:
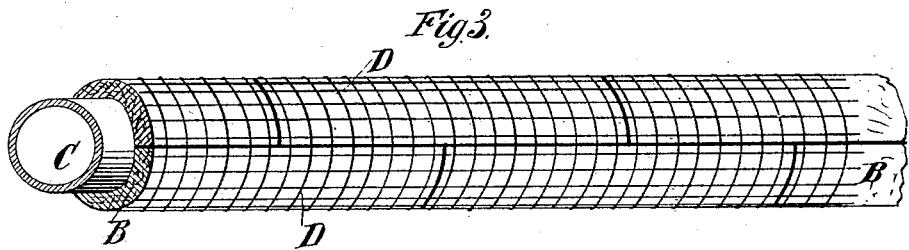

In the accompanying drawings, Figure 1 represents a flat tile embodying my invention. Fig. 2 is a semicircular tile, such as would be used for covering a steam-pipe; and Fig. 3 represents a portion of steam-pipe covered by tiles embodying my invention.

Similar letters of reference designate corresponding parts in the several figures.

A designates the flat tile or section, which is shown in Fig. 1, and B designates the semicircular tile or section shown in Fig. 2. These tiles or sections include as their essential element carbonate of or calcined magnesia, and they may also comprise any suitable fibrous material which will bind the magnesia together and shield or protect it against fracture. This fibrous material, so far as my invention applies to molded tiles or sections, may be animal hair, wool, asbestus, and various other materials which are not readily affected by heat. I may also employ in my composition, from which the tiles or sections are made, a small quantity of plaster-of-paris.

The proportions of the carbonate of magnesia, fibrous material, and plaster-of-paris may be widely varied for different purposes. A composition which is well adapted to the purpose may be composed of: carbonate of or calcined magnesia, seventy-five parts; asbestus fiber twenty parts; plaster-of-paris, five parts. This composition may be mixed up into a suitable paste, the fibrous material and the plaster-of-paris being thoroughly incorporated with the magnesia by stirring, and the composition may then be molded into tiles or sections of the desired shape or size.

When employed in covering a boiler, steam-pipe, or other object, the tiles or sections molded in proper form may be placed upon the exterior of the vessel or pipe close together, so as to entirely cover the same, and then an outer jacket of wire-netting, canvas, paper, sheet metal, or other suitable material may be applied to hold the tiles or sections in their positions.

I have in Fig. 3 represented the steam-pipe C as having applied to it a covering composed of the molded sections B, which are placed thereon, so as to break joints, and are held in place by a jacket, D, of wire-netting, canvas, sheet metal, or other suitable material.

In covering a vessel or pipe with these molded tiles or sections, a small quantity of the composition may be placed in the joints, so as to close the joints, and also serve by its adhesive properties to hold the sections closely together.

I am aware that it is not new to employ magnesia in small quantities in a non-conducting composition, the magnesia being combined with other ingredients—such as steatite and silicate of soda—in order to produce a composition which, when applied to the surface to be covered, will harden into a stone-like casing or shell. In such use the magnesia does not form of itself the principal non-conducting element of the composition, and Letters Patent to Merrell, No. 170,099, dated November 16, 1875, describe the use of such a composition to form a hard impervious shell or stone-like casing around a non-conducting covering whose principal ingredient is sawdust, hair, rice-hulls, or other fiber.

My composition, whether applied by placing it over the surface of a pipe or boiler, or by molding it into tiles or sections, includes as its principal element a major proportion of magnesia, and this magnesia forms of itself and is depended on to form the principal and important non-conducting material of the composition. Not only is a composition of about the proportions set forth by me very desirable, because of its great non-conducting character, but it is furthermore desirable because of its extreme lightness. It is, therefore, easily applied with little labor, and does not add materially to the weight of the pipe or other vessel covered by it.

What I claim as my invention, and desire to secure by Letters Patent, is—

1. A non-conducting covering or jacket composed of molded tiles or sections, of a composition which includes as its non-conducting element a major proportion of carbonate of or calcined magnesia, substantially as herein described.

2. A non-conducting covering or jacket composed of molded tiles or sections of a composition which includes a major proportion of carbonate of or calcined magnesia, and which also includes a sufficient quantity of fibrous material to bind the magnesia together, the magnesia forming of itself the principal non-conducting element of the composition, substantially as herein described.

3. The non-conducting composition herein described, consisting of a major proportion of carbonate of or calcined magnesia, which forms of itself the principal non-conducting element of the composition, and a minor proportion of asbestus fiber sufficient to bind the magnesia together, as herein set forth.

HIRAM M. HANMORE.

Witnesses:
H. LOUIS CLARK,
JOS. W. McCRAY.